United States Patent
Koh et al.

(10) Patent No.: US 9,165,378 B2
(45) Date of Patent: Oct. 20, 2015

(54) ACQUISITION OF COLOR CALIBRATION CHARTS

(71) Applicant: HEWLETT-PACKARD DEVELOPMENT COMPANY, L.P., Houston, TX (US)

(72) Inventors: Kok-Wei Koh, Palo Alto, CA (US); Ehud (Udi) Chatow, Palo Alto, CA (US); Melanie M Gottwals, Palo Alto, CA (US); Nathan Moroney, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/610,316

(22) Filed: Jan. 30, 2015

(65) Prior Publication Data

US 2015/0145989 A1    May 28, 2015

Related U.S. Application Data

(63) Continuation of application No. 13/754,885, filed on Jan. 30, 2013, now Pat. No. 8,976,252.

(51) Int. Cl.
| | |
|---|---|
| H04N 1/60 | (2006.01) |
| H04N 17/00 | (2006.01) |
| G06T 7/40 | (2006.01) |
| G01J 3/52 | (2006.01) |
| G01J 1/42 | (2006.01) |
| H04N 5/232 | (2006.01) |

(Continued)

(52) U.S. Cl.
CPC .............. *G06T 7/408* (2013.01); *G01J 1/4204* (2013.01); *G01J 3/524* (2013.01); *H04N 1/6033* (2013.01); *H04N 1/6086* (2013.01); *H04N 5/23293* (2013.01); *H04N 9/646* (2013.01); *H04N 17/002* (2013.01); *H04N 17/02* (2013.01); *G06T 2207/10004* (2013.01); *G06T 2207/10024* (2013.01); *G06T 2207/30168* (2013.01)

(58) Field of Classification Search
CPC .. H04N 17/002; H04N 1/6033; H04N 1/6086
USPC .......... 348/188, 177, 189, 180, 182; 382/165, 382/167; 358/1.9, 2.1, 518
See application file for complete search history.

(56) References Cited

U.S. PATENT DOCUMENTS

| | | | |
|---|---|---|---|
| 7,382,492 B2 | 6/2008 | Fujio et al. | |
| 7,602,525 B2 | 10/2009 | Arai | |

(Continued)

FOREIGN PATENT DOCUMENTS

| | | |
|---|---|---|
| JP | 11344383 | 12/1999 |
| JP | 2005003463 | 1/2005 |

(Continued)

OTHER PUBLICATIONS

Neel Joshi et al, "Automatic Color Calibration for Large Camera Arrays", 2005.

*Primary Examiner* — Jefferey Harold
*Assistant Examiner* — Jean W Desir
(74) *Attorney, Agent, or Firm* — HP Legal Dept

(57) ABSTRACT

The present disclosure related to acquisition of color calibration charts. In at least some examples herein, an image of a calibration color chart is processed. A lighting condition of the color calibration chart may be automatically determined.

20 Claims, 7 Drawing Sheets

(51) Int. Cl.
*H04N 9/64* (2006.01)
*H04N 17/02* (2006.01)

(56) References Cited

U.S. PATENT DOCUMENTS

| | | |
|---|---|---|
| 7,649,564 B2 | 1/2010 | Suekane et al. |
| 8,059,183 B2 | 11/2011 | Seto et al. |
| 8,073,248 B2 | 12/2011 | Brunner et al. |
| 8,149,405 B2 | 4/2012 | DiCarlo et al. |

| | | | |
|---|---|---|---|
| 2008/0046217 A1* | 2/2008 | Polonskiy et al. | 702/179 |
| 2009/0153745 A1 | 6/2009 | Park et al. | |
| 2010/0053653 A1 | 3/2010 | Hatori et al. | |
| 2012/0082374 A1* | 4/2012 | Agarwal et al. | 382/162 |
| 2013/0148885 A1 | 6/2013 | Lings et al. | |

FOREIGN PATENT DOCUMENTS

| | | |
|---|---|---|
| WO | WO-2007012314 | 2/2007 |
| WO | WO-2011089096 | 7/2011 |

* cited by examiner

ACQUISITION OF COLOR CALIBRATION CHARTS

BACKGROUND

There are a variety of situations where accurate color reproduction in digital imaging is desired. For example, many companies demand that their corporate identities—things such as logos and product advertising—have a consistent look and color, no matter where the actual printing or display occurs. Other examples include taking digital images of products for advertising. If the color in the images is not an accurate representation of the color of the product, the consumers are not able to make informed purchasing decisions.

To facilitate color reproduction, a color calibration chart (also referred to as "color chart") may be acquired and, based on the acquired image of the color chart, color profiling may be performed. For example, a color chart may include known color attributes that can be used to measure colors in an image. Further, color charts may be used to color calibrate and/or generate color profiles of digital input devices such as digital cameras or scanners and output display systems like printers, monitors and projectors as well as for color correction of an acquired image. A color chart may be constituted as a flat, physical object colored with an arrangement of standardized color samples.

BRIEF DESCRIPTION OF THE DRAWINGS

In order that the present disclosure may be well understood, various examples will now be described with reference to the following drawings.

Figure 1:
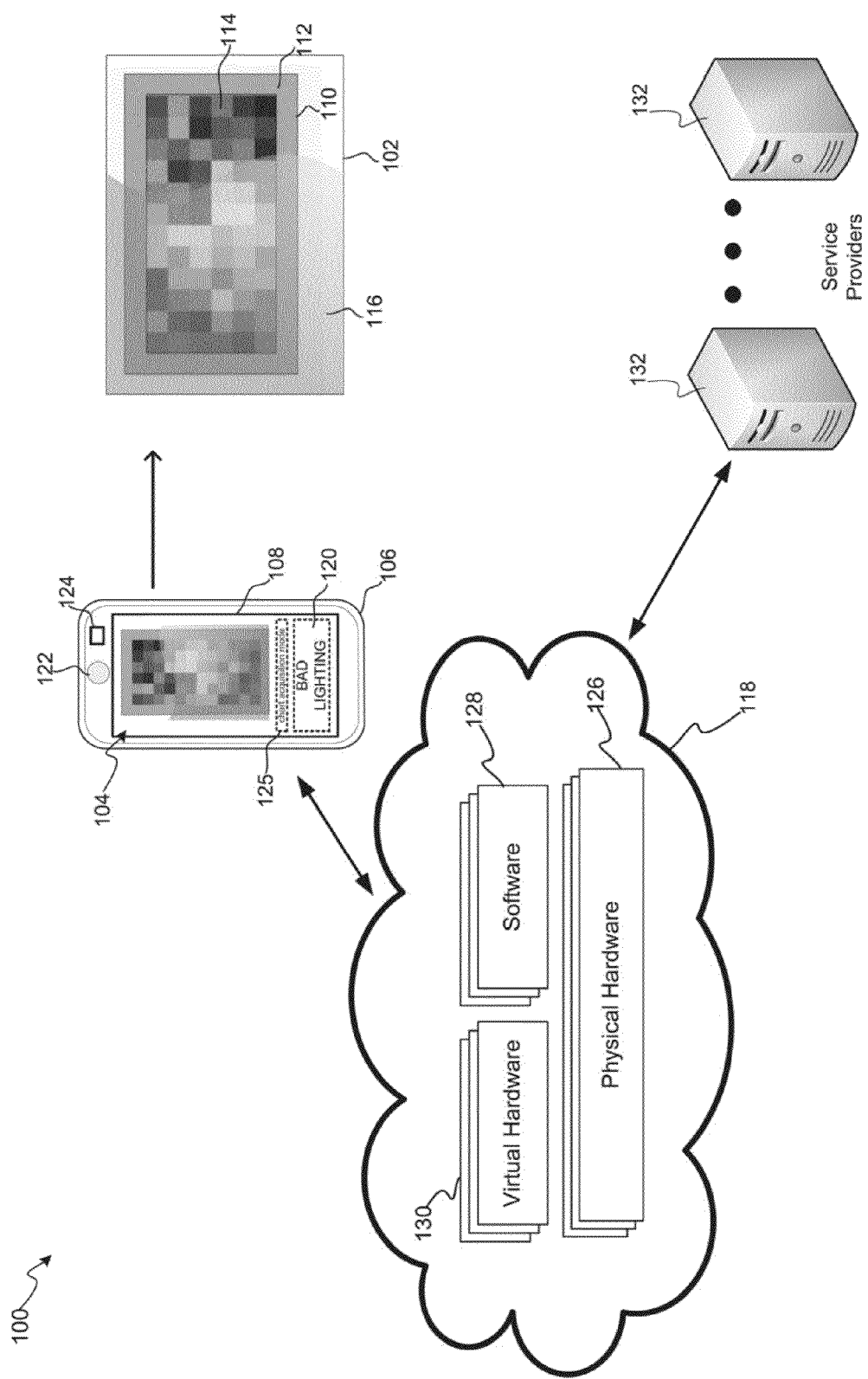
FIG. 1 is an environment in which examples can be implemented.

DETAILED DESCRIPTION in the following description, numerous details are set forth to provide an understanding of the examples disclosed herein. However, it will be understood that the examples may be practiced without these details. While a limited number of examples have been disclosed, it should be understood that there are numerous modifications and variations therefrom. Like numerals may be used for like and corresponding parts of the various figures.

As discussed above, a color chart may be used for color profiling. More specifically, an image of a color chart might be acquired by an imaging device. From the imaged color chart a color profile might be generated. For example, a color profile might be generated in the form of a look-up table relating (i) colors actually being acquired by the imaging device to (ii) corresponding true colors. Other types of color profiling might be performed, such as color correction of colors in an image, conveying a true color of a sample, or determining variance from an acquired color to a target color based on the acquired color chart.

Generally, the manner a color chart is imaged affects color profiling. A deficient imaging of the color chart might result in an inaccurate color profiling, or even may make impossible color profiling. One of the factors that might significantly affect, color profiling is lighting of a color chart. An inappropriate lighting condition can originate from shadows over the color chart or specular highlights on the color chart caused by deficient illumination. This is illustrated by referring to FIG. 1. An image 104 of a physical color reference 102 may be acquired by a mobile imaging device 106. Physical color reference 102 is comprised of a color chart 110 including a color background 112 surrounding a plurality of color patches 114. Color chart image 104 is displayed by display 108 of device 106. (For the sake of simplicity, color backgrounds and color patches of color charts herein are shown using grey tones; however, if will be understood that they might be constituted by combinations of also non-grey colors.)

Color patches 114 correspond to a set of colors that enable generation of a color profile, i.e., a set of data that characterizes a color input acquired by mobile imaging device 106. For example, as illustrated with respect to FIGS. 12A-12C, the color profile can be used to convey true colors of samples in a scene acquired, by mobile imaging device 106 with a physical color reference embedded in the scene. Further, color patches 114 may be used to perform a color calibration of mobile imaging device 106.

The set of colors corresponding to color patches 114 may be standardized, i.e. color of color patches 114 may be selected to correspond to specific colors established for generating a color profile. A software application for color profiling may access information related to the specific colors associated with a color chart and use an acquired image of color chart 110 for generating a color profile. Further, color chart 110 may also have dimensions (e.g., patch size and position) that are also standardized so that an application can automatically recognize a specific set of colors from an acquired image of color chart 110 by color measuring selected spots of known locations. Color of color patches 114 may be selected to improve color profiling in specific use cases. For example, color set of color chart 110 might be tuned to be more effective for color profiling of a specific type of scene, such as an outdoor scene, an indoor scene, or any other type of scene.

As can be appreciated from FIG. 1 (which is illustrated its more detail below), physical color reference 102 is casually imaged such that a shadow 116 is cast over color chart 110. Shadow 116 might be produced, for example, by a user holding mobile imaging device 106 too close to physical color reference 102. Shadow 116 is accordingly reproduced in image 104. Such lighting condition of physical color reference 102 may significantly affect color profiling based on a reproduction of color chart 110. Moreover, such a deficient lighting condition might make color profiling unfeasible. In any case, such an inappropriate lighting of color chart 110 may result in a deficient color profiling. Such a deficient color profiling may not be noticed by the user, in which case results of the color profiling (e.g., color profiling or color calibration) might be inadvertently inaccurate. On the other hand, if the user subsequently notices the deficient lighting condition, the whole acquisition process must be repeated from the beginning. In every case, user experience would be poor.

At least some of the principles described below solve these challenges by automatically determining lighting condition of an imaged color calibration chart. The determination is used to facilitate acquisition of the color chart under a selected lighting condition and, more specifically, under a lighting condition that is appropriate for performing color profiling based on the acquired color calibration chart. At least some of the examples herein can be used to reduce color correction errors and/or detect quality of a color chart capture.

A color chart is intended to encompass any suitable physical color reference comprised of a set of colors selected to enable generation of a color profile. Such a color profile can be used, for example, for color calibration, of a device or color correction or estimation from an image. A color chart may be constituted as a flat, physical object colored with an arrangement of standardized color samples (e.g., a plurality of color patches). Color charts, such as the X-Rite color checker, may be rectangular and have a selected size and color patch layout.

As used herein, determining a lighting condition of an imaged color calibration chart refers to processing an image of the chart to assess illumination under which the chart has been imaged. Examples of procedures for determining a lighting condition are set forth below with respect to FIG. 8.

In the following, FIG. 1 is illustrated in more detail. FIG. 1 shows an environment 100 in which examples can be implemented. Environment 100 includes physical color reference 102, mobile imaging device 106, a cloud computing system 118 (hereinafter referred to as cloud 118, and service providers 132. (Specific details on physical color reference 102 are set forth above.)

Mobile imaging device 106 is configured to acquire images, such as image 104 of physical color reference 102. In the illustrated example, imaging device 106 includes a camera 122 and display 108 to display an image acquired by camera 122. Device 106 might be a dedicated digital imaging camera such as compact digital camera or an interchangeable lens digital camera or a wearable camera. Further, device 106 might be a device dedicated to color profiling. In other examples, device 106 is a multi-use device with advanced computing capabilities such as a smartphone or a tablet. Device 106 may include a flash 124 to facilitate suitable lighting of color chart 110 by instantaneously producing a flash of light at the time an image of color chart 110 is being acquired. For example, flash 124 may be constituted of a LED. In the illustrated example, camera 122 and flash 124 are illustrated located at the same side than display 108 (e.g., a front side of a smartphone). Camera 122 and flash 124 may be provided at other suitable locations of mobile imaging device 106 such as the side opposite to display 108 (e.g., a rear side of a smartphone or a tablet), imaging device 106 may include more than one camera and flash. For examples, imaging device 106 might include cameras and flashes at both a rear side and a front side.

Mobile imaging device 106 may be configured to communicate with cloud 118. For example, mobile imaging device 106 may transmit data related to image 104 to cloud 118 and receive data from cloud 118 via a network (not shown) such as the internet or any other suitable network. Data transmitted to cloud 118 may be the acquired image of color chart 110. Data received from cloud 118 may be a color profile based on the acquired image of color chart 110.

In the illustrated example, mobile imaging device 106 includes a signaler 120 to signal at the imaging device 106, whether color chart 110 is imaged under a selected lighting condition. In the illustrated example, signaler 120 is implemented as a graphical user interface (GUI) element displayed adjacent to image 104. In this example, signaler 120 is to display a text string indicative of the lighting condition under which color chart 110 has been acquired. For example, signaler 120 may display "bad lighting" (as shown in this example) or "good lighting." It will be understood that there are a variety of implementations for a signaler. For example, signaler 120 may be a visual indicator at imaging device 106 (e.g., a dedicated display element) or any other suitable device to visually signal a lighting condition. Alternatively, or in addition thereto, signaler 120 may be for acoustically signaling to a user the lighting conditions. Signaler 120 may operate in collaboration with a determination engine, such as lighting determination engine 204 shown in FIG. 2, that determines lighting condition of the acquired color calibration chart. From the determined condition, it can then be identified how signaler 120 is to be operated. Such a determination engine might be run in the premises of imaging device 106 or of a computing system communicatively coupled thereto such as cloud 118.

Mobile imaging device 106 may provide a color chart acquisition mode in which it is configured to automatically detect a color chart in an acquired image (automatic chart detection is illustrated below). Such a color chart acquisition mode selectable by a user via, for example, a GUI element (not shown) displayed by display 108 or a dedicated hardware selector (not shown) at the device (i.e., a dedicated button). Activation, of a color chart acquisition mode may be indicated to a user via a label 125 in display 108. In the example of FIG. 1 this label reads "chart acquisition mode".

Cloud 118 is a computing system including multiple pieces of hardware operatively coupled over a network so that they can perform, a specific computing task and, more specifically, deliver services to mobile imaging device 106. Cloud 118 includes a combination of physical hardware 126, software 128, and virtual hardware 130. Cloud 118 is configured to (i) receive requests and/or data from mobile imaging device 106, and (ii) return request responses and/or data to mobile imaging device 106 for implementing specific services. By way of example, cloud 118 may be a private cloud, a public cloud or a hybrid cloud, further, cloud 118 may be a combination of cloud computing systems including a private cloud (or multiple private clouds) and a public cloud (or multiple public clouds).

Physical hardware 126 may include, among others, processors, memory devices, and networking equipment. Virtual, hardware 130 is a type of software that is processed by physical hardware 126 and designed to emulate specific software. For example, virtual hardware 130 may include a virtual machine (VM), i.e. a software implementation of a computer that supports execution of an application like a physical machine. An application, as used herein, refers to a set of specific instructions executable by a computing system for facilitating carrying out a specific task. For example, an application may take the form of a web-based tool providing users with color profiling capabilities based on an image acquired by mobile imaging device 106. Software 128 is a set of instructions and data configured to cause virtual hardware 130 to execute an application for providing a service to mobile imaging device 106. Thereby, cloud 118 can make applications related to color profiling, or any other type of service, available to mobile imaging device 106.

Service provider systems 132 represent on-premise systems of service providers that may provide a service to a user of mobile imaging device 106 via cloud 118. Such services may be based on color profiling. For example, service provider systems 132 may be operated by print service providers (PSPs). Thereby, environment 100 might facilitate color calibrated communication between the user of mobile computing system 106 and PSPs. For example, mobile computing system 106 might be used to simultaneously acquire color chart 110 and a color sample as described below with respect to FIGS. 12A-12C. Thereby, lighting determination as described herein might ensure that color chart 110 is acquired under proper lighting conditions. From the image, a calibrated ("true") color request, can be sent via cloud 118 to one or more of the PSPs operating service provider systems 132. The PSPs may then formulate an offer based on the calibrated color request. For example, they might communicate how accurately can they reproduce the calibrated color request and/or communicate associated pricing.

It will be understood that environment 100 is merely an example and that other environments for implementing examples are foreseen. For example, but not limited thereto, functionality for color profiling may be completely implemented on premises of mobile imaging device 106. Thereby, mobile imaging device 106 might be operated independently from a remote computing system (e.g., cloud 118) for implementing functionality described herein.

Figure 2:
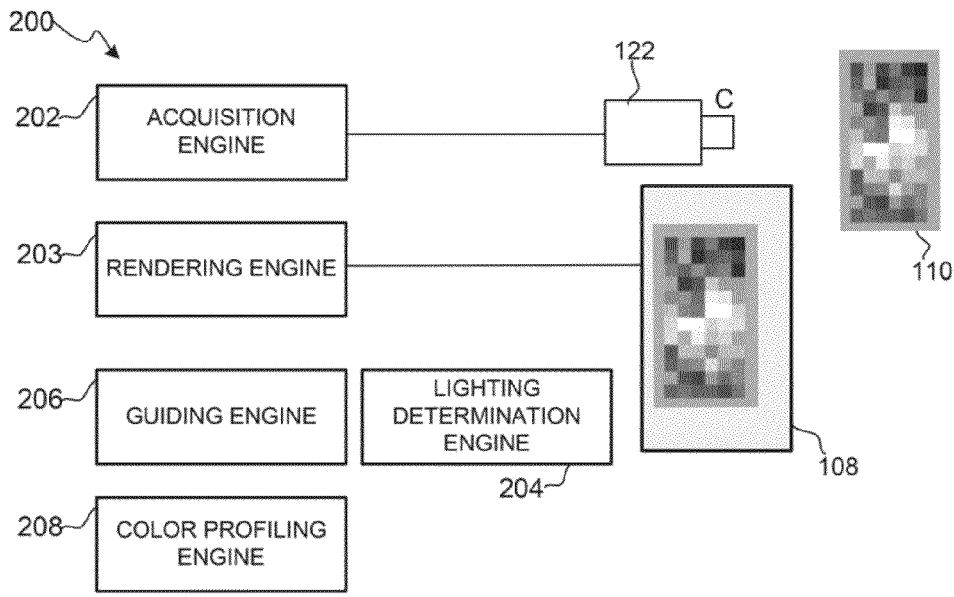
FIG. 2 is a block representation of elements of a mobile imaging device for implementing examples.

FIG. 2 shows a schematic representation of a mobile imaging device 200 for implementing examples. Mobile imaging device 200 includes a camera 122 and a display 108 to display image 104 acquired by camera 122. FIG. 2 also depicts physical and logical components of device 200 for implementing various examples of functionality. More specifically, mobile imaging device 200 is shown to include an acquisition engine 202, a lighting determination engine 204, and a guiding engine 206. In examples, mobile imaging device 200 may further include a rendering engine 203 and a color profiling engine 208.

Camera 122 may be constituted by any digital acquisition arrangement suitable to acquire an image of color chart 110. For example, camera 122 may be constituted by a CCD sensor (not shown) operatively coupled to driving circuitry (not shown) and optics suitable to perform acquisition of color chart 110. It will be understood that there are a variety of manners for implementing camera 122.

Display 108 may be constituted by any digital display arrangement suitable to display an image of color chart 110 and, if necessary, GUI elements as described herein. For example, display 108 may be constituted by a flat panel display (e.g., an LCD display) operatively coupled to suitable driving circuitry (not shown). In examples, display 108 may be a touchscreen to facilitate user interaction.

Acquisition engine 202 represents, generally, any combination of hardware and programming configured to process an image of a color chart acquired by the camera. For example, acquisition engine may cause camera 122 to acquire an image of color chart 110 (e.g., image 104 in FIG. 1). Alternatively, or additionally thereto, acquisition engine 202 may communicate, directly or indirectly, to camera 122 to obtain digital data acquired by camera 122, the digital data including a digital representation of color chart 110. This digital data may comprise data reproducing color chart 110. In examples, acquisition engine 202 may include more specific features such as automatic detection of color chart 110. Examples on automatic detection of color chart 110 are set forth below with respect to FIG. 6.

Rendering engine 203 represents, generally, any combination of hardware and programming configured to operate display 108 for rendering a selected graphic thereon. In an example, acquisition engine 203 is to operate display 108 to render image 104 of color chart 110. In examples, rendering engine 203 may collaborate with guiding engine 206 for rendering GUI elements that facilitate guiding a user to acquire color chart 110 under selected lighting conditions as described herein (see, for example, signaler 120 in FIG. 1).

Lighting determination engine 204 represents, generally, any combination of hardware and programming configured to determine lighting condition of an acquired color calibration chart (e.g., the reproduction of color chart 110 in image 104 shown in FIG. 1). There are a variety of configurations of lighting determination engine 204 to implement this functionality. For example, lighting determination engine 204 may implement process flow 800 illustrated below with respect to FIG. 8. It will be understood that there are a variety of manners of implementing lighting determination engine 204.

Guiding engine 206 represents, generally, any combination of hardware and programming configured to guide a user in the acquisition of the color calibration under a selected lighting condition. Such a selected lighting condition may be, for example, acquiring a color calibration chart under a selected angle. For example, guiding engine 206 may collaborate with rendering engine 203 to cause the display of a frame on display 108. Such a frame indicates acquisition of color calibration chart 110 under a selected angle as further detailed below with respect to FIGS. 12A to 12C. Further, such a frame facilitates automatic image capture when a color chart is captured within the defined frame. The selected angle may be a pre-selected angle in the imaging device. Further, the selected angle may be an angle dynamically selected in view of pre-determined brightness conditions. Further, the selected angle may be an angle selected by the user.

In examples, guiding engine 206 processes lighting conditions determined by lighting determination engine 204 and accordingly provide a user feedback. For example, referring back to FIG. 1, guiding engine 206 may be configured to operate signaler 120 according to a lighting condition to indicate a user of mobile imaging device 106 whether color chart 110 is imaged under a selected lighting condition (e.g., a lighting of the color chart acceptable to perform color profiling).

Further, guiding engine 206 may be to (e.g., via signaler 120) prompt a user of mobile imaging device 106 to re-acquire color chart 110 under a different imaging condition. For example, guiding engine 206 may be configured to prompt a user to acquire multiple images of color chart 110 until an image with appropriate imaging conditions is acquired and/or multiple images are obtained that are adequate to perform color profiling by averaging, as further detailed below with respect to FIGS. 9 and 10. Further, guiding engine 206 may be configured to cause display 108 to display image 104 zoomed during acquisition of color chart 110. Thereby, it is facilitated that the user acquires color chart 110 from a distance that is far enough to avoid casting shadows on the color chart to be acquired.

Guiding engine 206 may be further to operate elements of mobile imaging device 106 to facilitate imaging color chart 106 under selected lighting conditions. For example, guiding engine 206 may be to operate flash 124 to provide a flash of light tuned to acquire color chart 110 under selected conditions that facilitate color profiling. Alternatively, or in addition thereto, guiding engine 206 may be to increase brightness of display 108 to provide such flash of light.

Guiding engine 206 may be activated at the time mobile imaging device 106 enters into a color chart acquisition mode selectable by a user. Alternatively, or in addition thereto, color chart acquisition mode may be activated automatically once acquisition of a color chart is automatically detected by acquisition engine 202.

Color profiling engine 208 represents, generally, any combination of hardware and programming configured to perform a color profile based on a reproduction of color chart 110 acquired by mobile imaging device 106. It will be understood that there are a variety of methods available for performing color profiling. For example, color profiling engine 208 may be to estimate true colors of a sample image acquired by mobile imaging device 106 based on the acquired color chart, as illustrated below with respect to FIG. 12A-12C.

Further, color profiling engine 208 may be to color calibrate mobile imaging device 106 based on the acquired color chart. Color calibration of mobile imaging device 106 comprises measuring and/or adjusting its color response to a known state. More specifically, color calibration might establish a known relationship to a standard color space. For color calibration, a reproduction of color chart 110 acquired by mobile imaging device 106 may be converted to color values. A correction profile can then be built using the difference between these color values and the known reference values corresponding to the set of colors in color chart 110.

It will be understood that the set of engines shown in FIG. 2 as part of mobile imaging device 106 is merely illustrative and different configurations of the engines are foreseen. For example, referring to the environment of FIG. 1, mobile imaging device 106 may implement acquisition engine 202, guiding engine 206, and lighting determination engine 204. Color profiling engine 208 may be implemented by cloud 118. Mobile imaging device 106 may communicate with cloud 118 for implementing color profiling capabilities. In other examples, the set of engines in FIG. 2 are implemented on the premises of mobile imaging device 106 so that it can independently implement functionality described herein.

Figure 3:
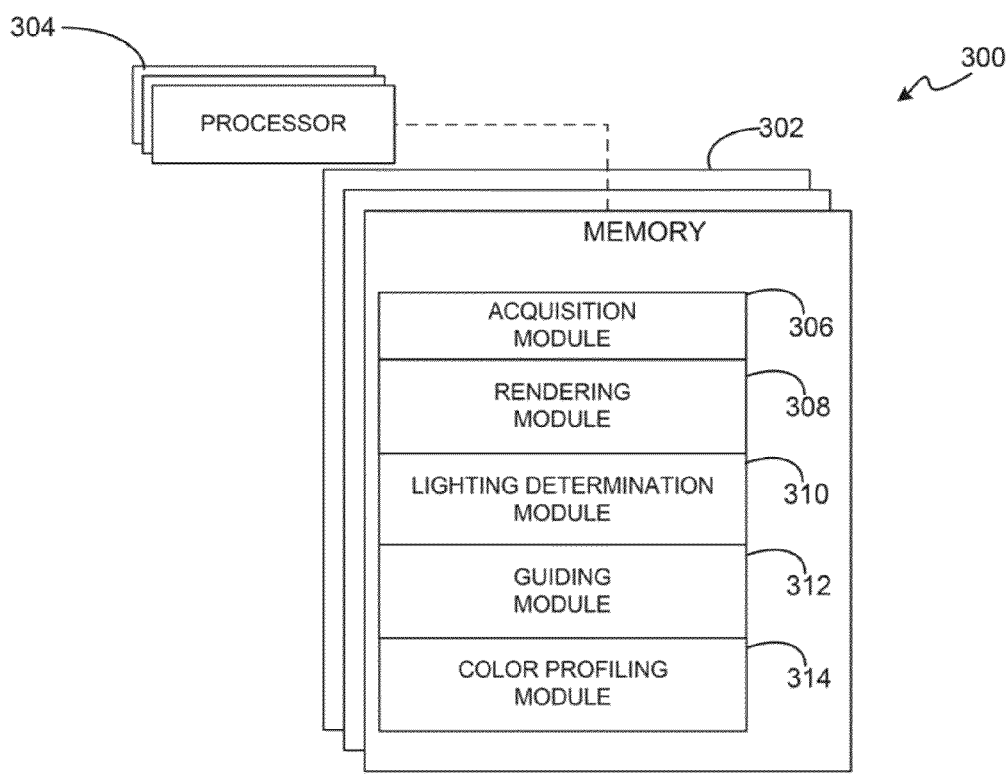
FIG. 3 depicts examples of physical and logical components for implementing various examples

In foregoing discussion, various components were described as combinations of hardware and programming. Such components may be implemented in a number of fashions. Referring to FIG. 3 the programming may be processor executable instructions stored on tangible memory media 302 and the hardware may include a processor 304 for executing those instructions. Memory 302 can be said to store program instructions that when executed by processor 304 implement a system 300 comprising the engines illustrated in FIG. 2. Memory 302 may be integrated in the same device as processor 304 or it may be separate but accessible to that device and processor 304. Processor 304 may be implemented in mobile computing device 106 or in a remote computing system operatively connected thereto such as cloud 118.

In one example, the program instructions can be part of an installation package that can be executed by processor 304 to implement system 300. In this case, memory 302 may be a portable medium such as a CD, DVD, or flash drive or a memory maintained by a server from which the installation package can be downloaded and installed. In another example, the program instructions may be part of an application or applications already installed. Here, memory 302 can include integrated memory such as a hard drive.

In FIG. 3, the executable program instructions stored in memory 302 are depicted as an acquisition module 306, a rendering module 308, a lighting determination module 310, a guiding module 312, and a color profiling module 314.

Acquisition module 306 represents program instructions that when executed cause the implementation of acquisition engine 202 of FIG. 2. Likewise, rendering module 308 represents program instructions that when executed cause the implementation of rendering engine 203 of FIG. 2. Likewise, lighting determination module 310 represents program instructions that when executed cause the implementation of lighting determination engine 204 of FIG. 2. Likewise, guiding module 312 represents program instructions that when executed cause the implementation of guiding engine 206 of FIG. 2. Likewise, color profiling module 314 represents program instructions that when executed cause the implementation of color profiling engine 208 of FIG. 2.

FIGS. 4 to 10 are exemplary flow diagrams to implement examples herein. In discussing FIGS. 4 to 10, reference is made to the diagrams in FIGS. 1 to 3 to provide contextual examples. Implementation, however, is not limited to those examples. Reference is also made to the examples depicted in FIGS. 11 to 12C. Again, such references are made simply to provide contextual examples.

Figure 4:
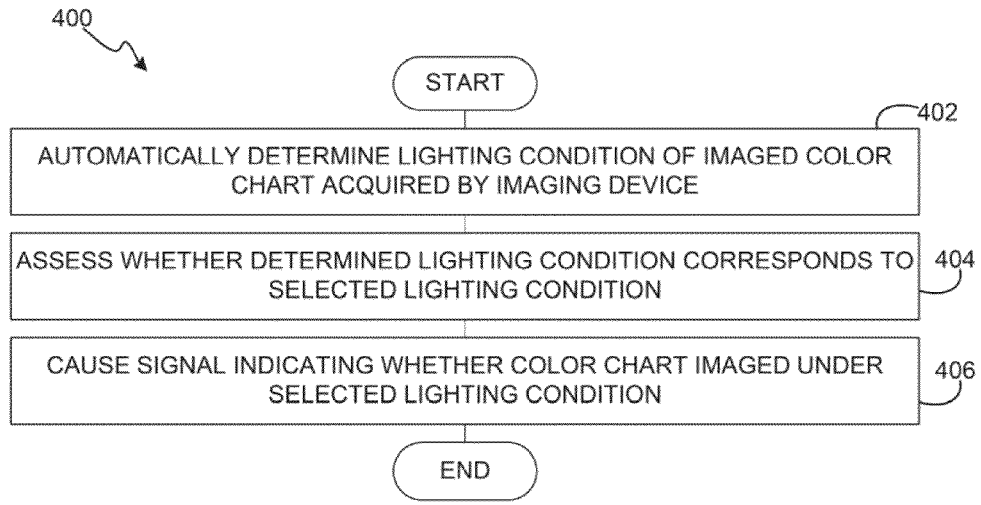
FIGS. 4 to 10 are exemplary flow diagrams to implement examples herein.

FIG. 4 illustrates a flowchart 400 for implementing methods according to examples herein. The method of flowchart 400 may be for operating mobile imaging device 106. At least some of the blocks of flowchart 400 might be executed by a processor in mobile imaging device 106. Some of the blocks of flowchart 400 might be remotely executed by, for example, cloud 118.

At block 402, lighting condition, of an imaged color calibration chart acquired by an imaging device is automatically determined. Details on lighting condition determination are set forth below with respect to FIG. 8. At block 404, it is assessed whether the lighting condition determined at block 402 corresponds to a selected lighting condition. A selected lighting condition may be a lighting condition that is appropriate for performing color profiling, based on the acquired color calibration chart. Lighting determination engine 204 may be responsible for implementing blocks 402 and 404.

At block 406, a signal via mobile imaging device 106 is caused. The signal indicates whether the color calibration chart is imaged under the selected lighting condition according to the determination performed at block 404. Guiding engine 206 may be responsible for implementing block 406. More specifically, guiding engine 206 might operate signaler 120 to indicate to a user whether lighting condition of color chart 110 is appropriate, as illustrated above with respect to FIG. 1.

Figure 5:
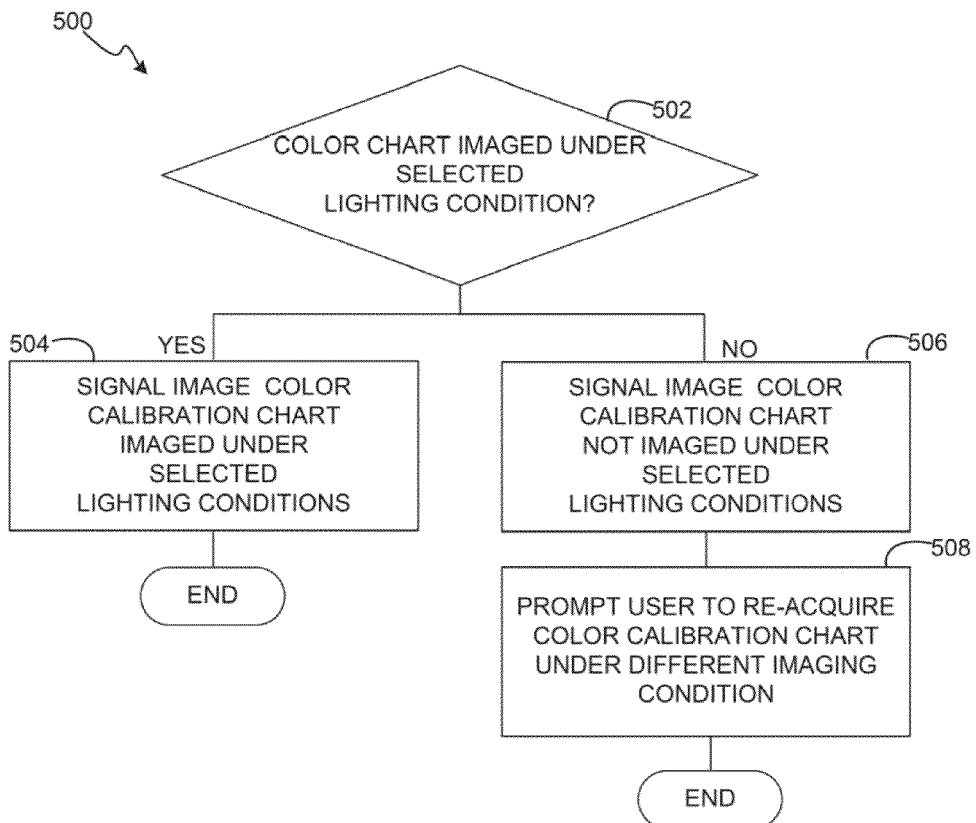

FIG. 5 illustrates a flowchart 500 which more specifically illustrates signaling of color chart lighting conditions. At block 502 it is assessed whether color chart 110 is imaged under a selected lighting condition. If color chart 110 is imaged under the selected imaging condition, for example, the acquired image is appropriate for performing color profiling, flowchart 500 goes to block 504. At block 504, it is signaled that color chart 110 is imaged under the selected imaging conditions as set forth above with respect to FIG. 4. For example, guiding engine 206 might operate signaler 120 to display a text message indicating that the color chart 110 has been acquired correctly.

If color chart 110 is not imaged under the selected imaging condition, for example, the acquired image is not appropriate for performing color profiling, and flowchart 500 goes to block 506. At block 506, it is signaled that color chart 110 is not imaged under the selected imaging conditions. For example, guiding engine 206 might operate signaler 120 to display a text message indicating that color chart 110 has not been acquired correctly, as shown in FIG. 1.

Upon determining that lighting conditions is not proper, further actions might be taken to guide the user for properly acquiring color chart 110. For example, flowchart 500 may include a block 508 in which a user of mobile imaging device 106 is prompted to re-acquire color chart 110 under a different imaging condition. Guiding engine 206 may be responsible of implementing block 510. For example, guiding engine 206 may operate signaler 120 to display a prompting text message.

Prompting the user at block 508 might be additionally complemented with guiding that provides feedback that may help the user to acquire images of color chart 110 under proper lighting conditions. For example, areas of color chart 110 that are not properly illuminated might be highlighted in display 108 so that a user can recognize which areas of color chart 110 are affected by an improper illumination. More specifically, several different locations around color chart 110 and sample areas (not shown), which all have the same reflectance characteristics (either paper white or printed with the same ink amounts), can be captured by camera 122. If lighting determination engine 204 finds that the variance among these different locations exceeds a certain, threshold, guiding engine 206 can highlight the areas that differ the most from the mean among the different points.

Figure 6:
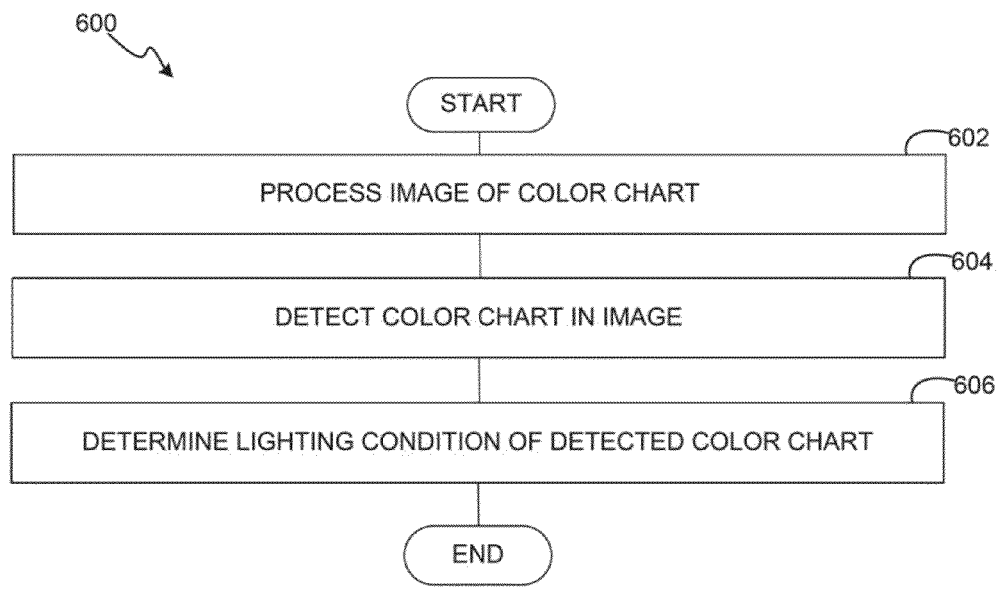

FIG. 6 illustrates a flowchart 600 for implementing methods according to examples herein. The method of flowchart 600 may be for operating mobile imaging device 106. At least some of the blocks of flowchart 600 might be executed, by a processor in mobile imaging device 106. Some of the blocks of flowchart 400 might be remotely executed by, for example, cloud 118.

At block 602, an image 104 of color chart 110 is processed. The processing at block 602 may include one or more of the following: (i) acquiring image 104 by acquisition engine 202, (ii) rendering image 104 on display 108 by rendering engine 203; or (iii) receiving linage 104 by lighting determination engine 204.

Figure 11:
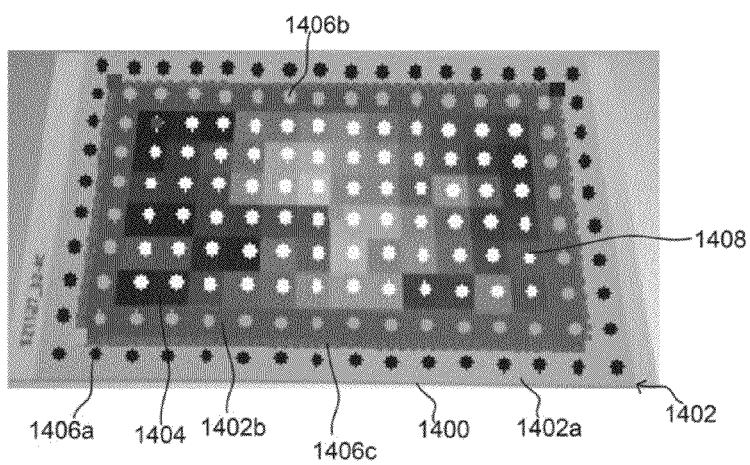
FIG. 11 is a representation of color chart acquisition according to examples herein.

At block 604, color chart 110 is automatically detected in the image. A color chart may be automatically detected by, for example. Identifying pre-defined differences between the standardized colors of the color chart and a color chart background. Alternatively, or in addition thereto, physical color reference 102 may be provided with an encoding element (e.g., a QR code, not shown) that can be read to automatically detect that image 104 contains color chart 110. Alternatively, or in addition thereto, color chart 110 may be automatically detected by identifying borders of preselected colors (e.g., color background 112) forming a frame for color patches 114 within the chart. (Such frames are also illustrated in FIG. 11 as sub-frames 1402a, 1402b. Once, the frame corners are identified and patches are located from their relative position from the frame corners. (Generally, dimensions and locations of color patches within the frame are predefined.) Acquisition engine 202 may be responsible for implementing block 604.

At block 606, it is automatically determined a lighting condition of color chart 110, detected at block 604. Details on how lighting condition can be determined are set forth below with respect to FIG. 8. Lighting determination engine 204 may be responsible for implementing block 606.

Figure 7:
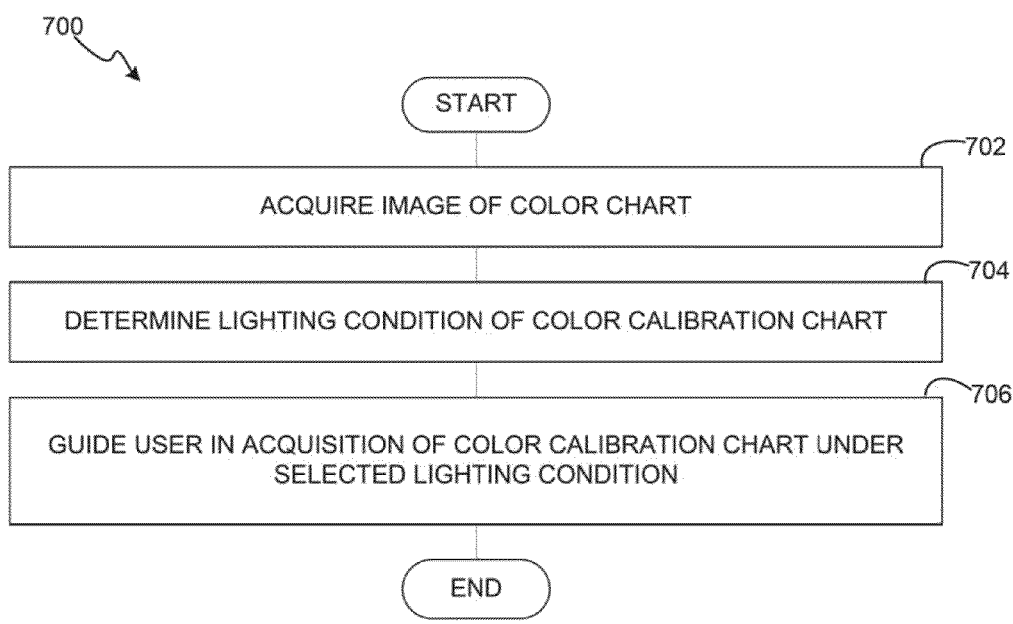

FIG. 7 illustrates a flowchart 700 for implementing methods according to examples herein. The method of flowchart 700 may be for operating mobile imaging device 106. At least some of the blocks of flowchart 700 might be executed by a processor in mobile imaging device 106. At block 702, an image 104 of color chart 110 is acquired. Acquisition engine 202 may be responsible for implementing block 702. At block 704, it is automatically determined a lighting condition of color chart 110, imaged at block 702. Details on how lighting condition can be determined are set forth below with respect to FIG. 8. Lighting determination engine 204 may be responsible for implementing block 704.

At block 706, a user is automatically guided in the acquisition of the color calibration under a selected lighting condition. Guiding may be to guide the user to acquire color chart under a selected angle or a selected position. This might be performed by, for example, displaying a frame on display 108, zooming a live image of color chart 110 in display 108, or prompting the user to re-acquire color chart 110. Some specific examples on automatic guiding are set forth below with respect to FIGS. 12A to 12C.

Figure 8:
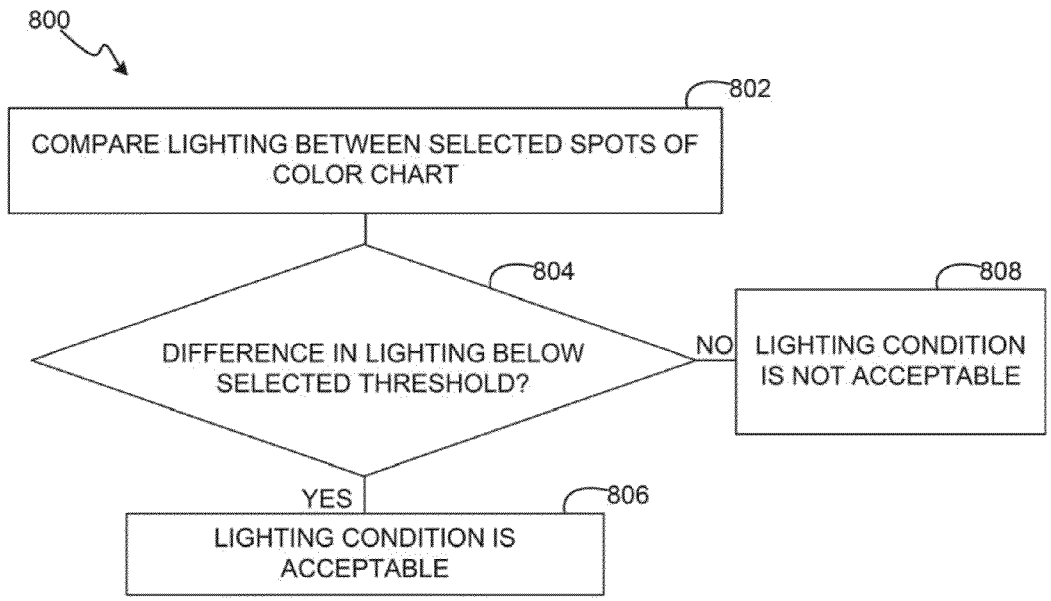

In at least some examples herein, lighting condition of color chart 110 is automatically determined. FIG. 8 shows flowchart 800 illustrating some examples for automatically determining lighting condition of a color chart. Blocks of flowchart 800 may be implemented by lighting determination engine 204. In illustrating flowchart 800, reference is made to FIG. 11. FIG. 11 depicts an imaged color chart 1400. Color chart 1400 includes a background area 1402 adjacent to color patches 1404. In the illustrated example, background area 1402 is a frame comprised of two sub-frames 1402a, 1402b. Each of two sub-frames 1402a, 1402b is colored differently, for example yellow and cyan, respectively.

At block 802, lighting between selected spots of the detected, color calibration chart is compared. More specifically, multiple measurement of a specific optical property such as color, relative lighting level, RGB levels or combinations thereof over a color chart may be performed for assessing lighting over the color chart.

The selected spots may be of a background area adjacent to color patches of the color calibration, chart. Different options for selecting the spots are illustrated in the following. In an example, the selected spots are at a uniform color some of the background area. More specifically, the uniform color zone may be a uniformly colored frame surrounding color patches of the color chart, such as color background 112 of color chart 110 or sub-frames 1402a, 1402b, in FIG. 11, potential candidates far selecting spots to measure lighting are depicted. In particular, a first set of spots 1406a is illustrated on sub-frame 1404b and a second set of spots 1406b is illustrated on sub-frame 1404b. For determining lightning condition, the specific optical property mentioned above may be measured for each spot in a spots set; differences in the measurement values between spots in the same set are then, indicative of lighting variances over color chart 1400. Multiple spot sets may be used for providing redundancy in the determination.

Alternatively, or in addition to measuring on uniform color zones, the selected spots may be at an interface between different color zones of the background area. In that case, the measurement may be a contrast measurement between the different color zones. Contrast variations are then indicative of lighting variances over the color chart. Such selected spots are also depicted in FIG. 11. In particular, spots 1406c are indicated at the interface between sub-frames 1406a and 1406b.

It will be understood that there are a variety of manners of selecting spots for performing the brightness comparison. For example, as an alternative to use of selected spots at a background area, the selected spots may correspond to separated color patches of the same color. More specifically, a color chart may contain two or more patches of the same color, the patches being distributed spatially across the chart. Color and/or brightness of these patches may be measured and then compared to each to determine measurement consistency, and hence lighting, across the chart.

The difference in lighting may be assessed from the measurements set forth above with respect to block 802. More specifically, the variation or consistency of the measurements at the selected spots may be computed and evaluated. In the illustrated example, at block 804, it is assessed whether a difference in lighting across the color chart is below a selected threshold. If the assessment at block 804 is positive, it is determined, at block 806, that lighting condition is acceptable. In other words, if the difference in lighting across the chart is sufficiently low, the acquired color chart may be usable tor color profiling. If the assessment at block 804 is negative, it is determined, at block 808, that lighting condition is not acceptable. In other words, if the difference in lighting across the chart is sufficiently high, the acquired color chart may be not usable for color profiling. It will be understood that the selected threshold, may vary depending on the specific application requirements such as accuracy required for color profiling.

In examples, image segmentation based on the measurements at the selected spots, e.g. by thresholding, may be performed to assess lighting variation and/or consistency across the chart and accordingly determine a course of action. For example, if variation and/or consistency across the chart is low, it might be further proceeded as normal. If variation and/or consistency is too strong, the user may be informed via a signal and/or may be prompted to re-acquire the color chart.

In examples, a color profile based on the defected color calibration chart may be generated taking into account lighting differences between the spots of the detected color calibration chart. More specifically, patch measurements for color profiling (illustrated in FIG. 11 by spots 1408) may be averaged and/or weighted based on the level of variation of lighting at each spot. Further, a color profile confidence interval may be determined based on lighting differences between the selected spots. More specifically, using image segmentation, areas of color chart that may be compromised due to lighting variation and/or inconsistency may be determined. A confidence interval may be assigned to color patches and used for determining accuracy of color profiling. Color patches with a low confidence interval may be discarded for color profiling. Further, a user may be warned of potential error when using, for color profiling, color patches with a low confidence interval. Moreover, an acquired color chart may be automatically rejected for color profiling if high variation and/or low consistency is determined.

According to examples herein, a user may be guided to acquire multiple images of a color chart in order to obtain data for color profiling that is not affected by unacceptable lighting conditions. More specifically, multiple images of a color chart may be captured by automatically guiding a user to go through a motion of waving or sweeping the mobile imaging device over the color chart. During this process, images can be captured at various angles and positions above the color chart. Thereby multiple images of the color chart can be processed and evaluated for assessing whether color profiling can be performed with adequate quality based on the color chart acquisitions, images of the color chart may be rejected and/or multiple images may be averaged together to obtain a more robust color measurement. This facilitates preventing problems associated with an inappropriate lighting condition of the color chart such as shadow's cast by the user or imaging device at some of the positions and for dealing with specular highlights at certain image capture angles.

In examples, a user may be automatically prompted by mobile imaging device 166 to re-acquire color chart 110 under a different imaging condition. A different imaging condition may be a different relative position between the imaging device and the color chart. Prompting may be implemented by any interactive method such as a suitable visual or acoustical indication to re-acquire the color chart. Based on the multiple images, a reproduction of the color chart can be obtained that is appropriate for color profiling. For example, multiple images of color chart 110 may be selected for color profiling. At least one of the multiple images may be selected for color profiling based on a lighting condition determined for each image. Alternatively, or in addition thereto, at least some of the multiple images may be averaged, so that color lighting variations across color chart 110 can be compensated. Some of these examples are illustrated in the following with respect to FIGS. 9 and 10.

Figure 9:
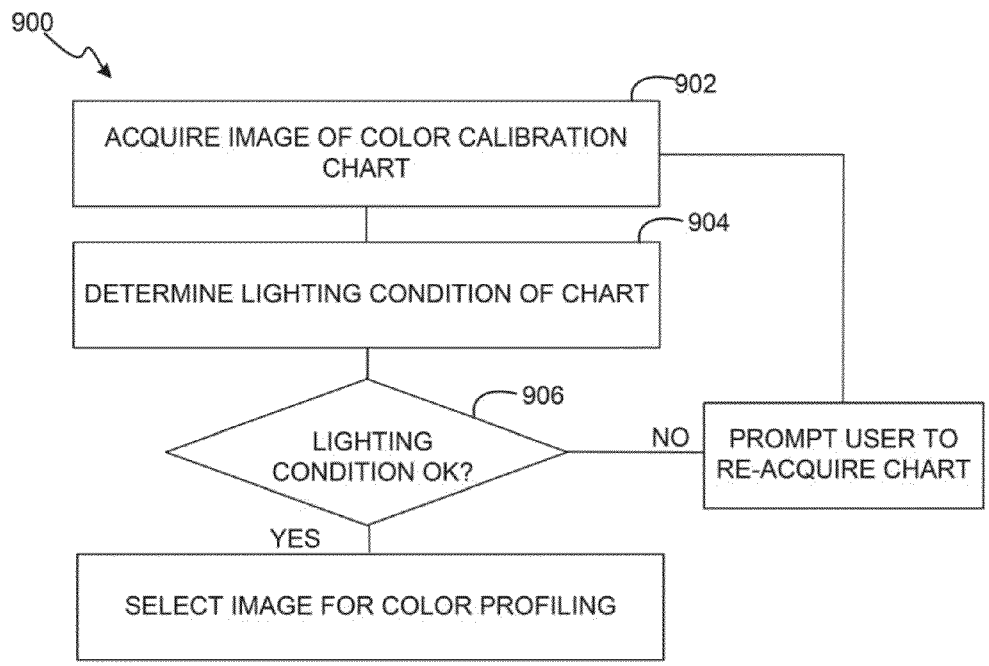

FIG. 9 illustrates a flowchart 900 illustrating examples of processing of multiple color chart images for performing color profiling. At block 902, an image of color chart 110 is acquired. At block 904 a lighting condition of color chart 110 is determined. This can be performed as set forth above with respect to FIG. 8. At block 906 if is assessed whether the lighting condition, determined at block 004 is acceptable for performing color profiling of the color chart image acquired at block 902. If at block 904 if is determined that the lighting condition is not acceptable, the user is prompted to re-acquire color chart 110 under different imaging conditions and flowchart 900 goes back to block 902. Thereby, the previously described process may be repeated until a color chart image with acceptable lighting conditions is acquired, if at block 904 it is determined that the lighting condition is acceptable, the color chart image acquired at block 902 is selected for color profiling at block 908.

Figure 10:
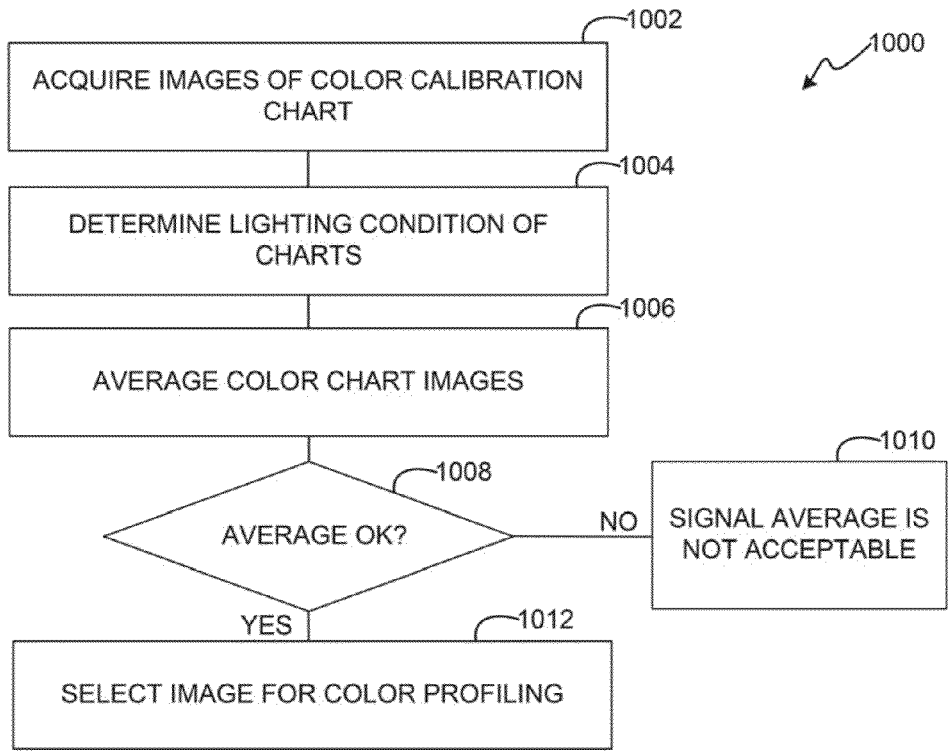

FIG. 10 illustrates a flowchart 1900 illustrating further examples of processing multiple color chart images for performing color profiling. At block 1002, a plurality of images of color chart 110 are acquired. Block 1002 may be performed iteratively by successively indicating a user to re-acquire color chart 110 under different imaging conditions. Indications may be provided to indicate the user how to re-acquire color chart 110. For example, the user might be guided to acquire color chart 110 under different angles. (Guiding the user to acquire a color chart under a selected angle is illustrated below with respect to FIGS. 12A to 12C.)

At block 1004, lighting conditions of the acquired color charts is determined. This can be performed for each color chart as set forth above with respect to FIG. 8. At block 1006, the acquired color chart images are averaged. The lighting conditions determined at block 1004 may be used to facilitate that the average compensates lighting variations. For example, as set forth above, areas of the acquired images may be averaged and/or weighted based on the local level of variation so that quality of the average is enhanced.

At block 1008 it is assessed whether the average obtained at block 904 is acceptable for performing color profiling of the color chart image based on the average. For example, despite the average, lighting variation across the averaged image might be too strong for enabling color profiling with acceptable quality. If at block 1008 it is determined that the average is not acceptable, at block 1010 it is signaled that the average is not acceptable. Alternatively, or in addition thereto, the user may be prompted to re-acquire color chart 110 under different imaging conditions. The re-acquired color chart image may be added to the average for trying to reach a sufficient quality. Alternatively, averaging might be re-started, and the user may be prompted to acquire a plurality of images. If at block 1008 it is determined that the lighting condition is acceptable, at block 1012 the average obtained at block 1006 is selected for color profiling.

As set forth above with respect to FIG. 7, a user may be guided for acquiring a color chart under selected lighting conditions. In the following some specific examples of user guiding are illustrated. In an example, a user may be guided to acquire a color calibration chart under a selected angle. More specifically, referring to FIGS. 1 and 2 guiding engine 206 may cause display 108 to display a frame on the display, the frame indicating acquisition of a color calibration chart under a selected angle. This guiding frame may be implemented as follows.

Figure 12A:
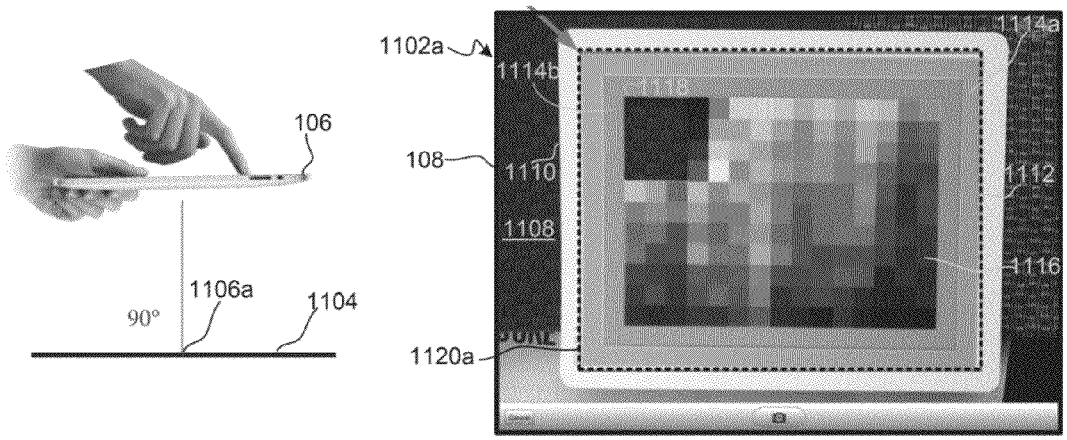
FIGS. 12A to 12C shows guiding a user to acquire a color chart under selected illumination conditions according to examples.
Figure 12B:
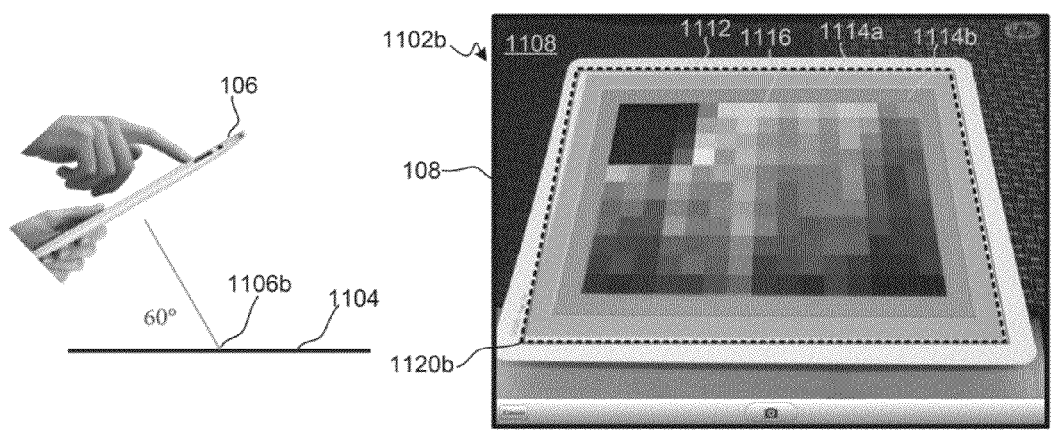
Figure 12C:
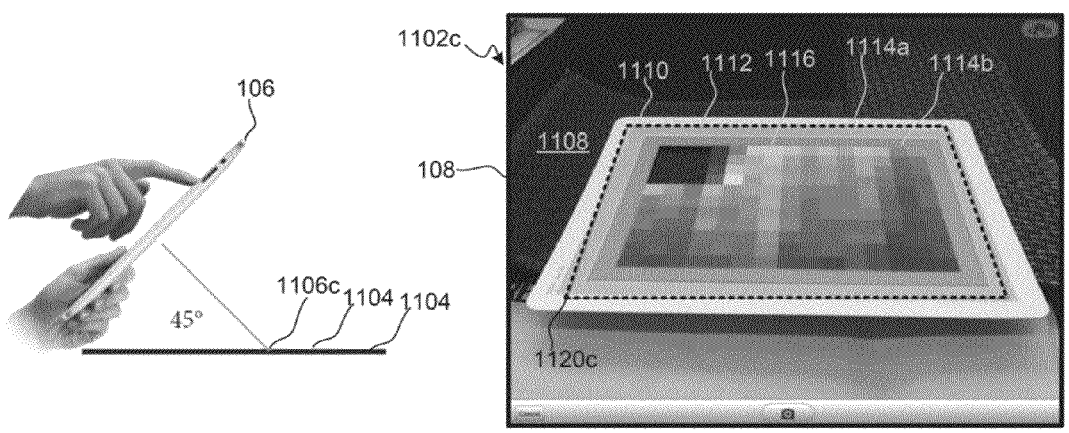

FIGS. 12A to 12C illustrates operation of mobile imaging device 106 for acquiring images 1102a-1102c of a target 1104 under different acquisition angles 1106a-1106c. In this example, imaging device 106 is illustrated as a tablet device. Imaging device 106 includes a rear camera (not shown) which is operated to acquire images 1102a-1102c and a display 108 to display acquired images 1102a-1192c. In the illustrated example, image acquisition is to obtain a color calibrated image of a sample 1108 via color profiling of at least one of images 1102a-1102c. More specifically, this color calibration may be performed to convey the true color of sample 1108. Therefore, target 1104 is composed of sample 1108 and a physical color reference 1110, which is thereby embedded in images 1102a-1102c.

Physical color reference 1110 is comprised of a color chart 1112 including color frames 1114a and 1114b surrounding a plurality of color patches 1116. In the illustrated example, physical color reference 1110 includes a window 1118 through which a portion of sample 1108 is visible. Window 1118 may be an open or transparent portion of color chart 1112. Window 1118 facilitates automatic color calibration of an imaged sample by enabling a defined positioning of the imaged sample with respect to imaged color patches 1116.

Color calibration of imaged sample 1108 and, more specifically, conveying a true color of the sample, may be performed by using embedded color chart 1110 to generate a color correction function that eliminates a discrepancy between colors measured by imaging device 106 and the known colors in color chart 1110. Obtaining such a color correction function is described in U.S. Pat. No. 7,522,767, which is incorporated herein by reference in its entirety (to the extent in which this document is not inconsistent with the present disclosure) and in particular those parts thereof describing conveying the true color of a subject.

For guiding a user to acquire color chart 1112, a frame 1120a-1120c can be displayed on display 108. Frame 108 indicates the user how color chart 1112 is to be acquired for achieving a selected acquisition angle. More specifically, when the user positions mobile imaging device 106 such that color chart 1112 fits in frame 1120a-1120c, the color chart can be acquired under the selected angle. Consequently, the shape and position of frame 1120a-1120c may be selected based on (i) the selected angle, (ii) shape of color chart 1112. In the illustrated example, color chart is 1112 is rectangular and, hence, frame 1120a-1120c is accordingly shaped to acquire it under the illustrated selected angles. In other examples, the color chart may be a distorted color chart, that is, a non-rectangular color chart, such as a trapezoidal color chart, to force a particular capture geometry or orientation on display 108.

As illustrated, in FIG. 12A, for guiding acquisition of color chart 1112 under a right angle (90°) frame 1120a is displayed as a rectangular frame in display 108. When the user positions imaging device 106 such that color chart 1112 fits in frame 1120a, the acquisition is performed under a right angle. Further, as illustrated in FIG. 12B, for guiding acquisition of color chart 1112 under an angle of 60°, frame 1120b is displayed accordingly distorted in display 108. When the user positions imaging device 106 such that color chart 1112 fits in frame 1120b, the acquisition is performed under a 60° angle. Further, as illustrated in FIG. 12C, for guiding acquisition of color chart 1112 under an angle of 45°, frame 1120c is displayed further distorted in display 108 as compared to the previous example in FIG. 12B, where the selected angle was less pronounced. When the user positions imaging device 106 such that color chart 1112 fits into frame 1120c, the acquisition is performed under a 45° angle.

In the example of FIGS. 12A to 12C a user is guided to acquire multiple captures of color chart at different angles. The multiple captures may be used for color profiling. For example, lighting condition may be determined for each of the captured images. Then, the color chart capture with a better lighting condition may be selected for color profiling while discarding the others. In addition, or alternatively thereto, the multiple captures may be used to improve color accuracy in the determination of the true color of the sample by reducing noise and specular reflections. For example, the multiple captures may be averaged analogously as set forth above with respect to FIG. 10.

In examples, a user may be guided for acquiring a color chart from a certain, relative position between the acquisition device, e.g. mobile imaging device 106, and the physical color reference, e.g. reference 1110. In an example, display 108 displays the image of physical color reference 1110 zoomed during acquisition of color chart 1112. Thereby, when the user tries to fit color chart 1112 into frame 1120a-1120c, the user is guided to set a higher distance between imaging device 106 and imaged target 1104. In other words, a camera zoom mode of imaging device 106 may be used to force the user to hold the imaging device away from color chart 1112 and the object of interest (i.e., sample 1108). This facilitates keeping mobile device 106 from being directly over target 1104 during acquisition. Thereby, it is prevented that the user casts shadows over color chart 1112 during color chart acquisition. As set forth above, such shadows may compromise lighting condition of the color chart.

In examples, imaging device 106 may be operated to enhance lighting condition during the acquisition of a color chart. More specifically, a lighting device of imaging device 106 may be operated to illuminate color chart 1112 during acquisition thereof. In an example, flash 124 (shown in FIG. 1) is operated to facilitate acquisition of color chart 1112 under a selected lighting condition. Alternatively, or in addition thereto, if the camera used to acquire the color chart is a front camera (e.g., camera 122 shown in FIG. 1), the display may be operated to illuminate the color calibration chart so as to facilitate acquisition of the color calibration chart under the selected lighting condition The used lighting device (e.g., flash 124 or display 108) may be regulated to enhance color chart acquisition. For example, multiple images of color chart 1112 may be successively acquired and lighting condition of color chart 1112 may be determined for each image; thereby, luminosity of the lighting device (e.g., flash 124 or display 108) may be regulated to facilitate an image of the color chart under selected lighting condition. Thereby, it is facilitated a sufficient illumination of the color chart while avoiding specular reflections caused by excessive illumination. More specifically, based on user feedback or an automatized lighting condition determination, described above with respect to FIG. 8, the better color chart acquisition (e.g. the more uniformly lit image thereof), with or without flash, can then be selected and used for color profiling.

In an example, acquisition, engine 202 may cause acquisition of two consecutive images of color chart 1112, one of the images being acquired operating flash 124 and another one of the images being acquired without operating flash 124. Lighting condition may then be determined for both acquired images and the one with a better lighting condition (e.g., a more uniform lighting across the chart) may be selected for color profiling.

It will be appreciated that examples above can be realized in the form of hardware, programming or a combination of hardware and the software engine. Any such software engine, which includes machine-readable instructions, may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of a tangible computer-readable storage medium that are suitable for storing a program or programs that, when executed, for example by a processor, implement embodiments. Accordingly, embodiments provide a program comprising code for implementing a system or method as claimed in any preceding claim and a tangible or intangible computer readable storage medium storing such a program. A tangible computer-readable storage medium is a tangible article of manufacture that stores data. (It is noted that a transient electric or electromagnetic signal does not fit within the former definition of a tangible computer-readable storage medium.)

The examples described above facilitates enhancing acquisition of a color chart to overcome problems related with deficient lighting thereof. As discussed above, the examples may be successfully deployed for performing color profiling based on an acquired image of a color chart. However, the examples may also be used in any application in which a color chart is to be imaged.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Further, flowcharts herein illustrate specific block orders; however, it will be understood that the order of execution may differ from that which is depicted. For example, the order of execution of two or more blocks may be scrambled relative to the order shown. Also, two or more blocks shown in succession may be executed concurrently or with partial concurrence. Further, claims reciting "a" or "an" with respect to a particular element contemplate incorporation of one or more such elements, neither requiring nor excluding two or more such elements. Further, at least the terms "include" and "comprise" are used as open-ended transitions.

What is claimed is:

1. A method comprising:
   automatically determining, by a processor, a lighting condition of an imaged color calibration chart acquired by an imaging device, including comparing multiple measurements of an optical property at selected spots in the imaged color calibration chart;
   assessing whether the determined lighting condition corresponds to a selected lighting condition that is appropriate for performing color calibration of a printing device based on the acquired color calibration chart, where the selected condition is an appropriate condition if a difference between the multiple contrast measurements is below a selected threshold; and
   when the color calibration chart has been imaged under the selected lighting condition, performing color calibration of the printing device.

2. The method of claim 1, wherein the printing device is a three-dimensional printing device.

3. The method of claim 1, wherein the optical property comprises reflectance.

4. A computer software product comprising a tangible medium readable by a processor, the medium having stored thereon a set of instructions, the instructions including:
   a set of instructions which, when loaded into a memory and executed by the processor, causes to process an image of a calibration color chart;
   a set of instructions which, when loaded into a memory and executed by the processor, causes to automatically detect the color calibration chart in the image;
   a set of instructions which, when loaded into a memory and executed by the processor, causes to automatically determine a lighting condition of the detected color calibration chart;
   a set of instructions which, when loaded into a memory and executed by the processor, causes processing multiple images of the color calibration chart for color profiling of a printing device, wherein two consecutive images of the color calibration chart are acquired, one of the consecutive images being acquired operating a flash and the another one of the consecutive images being acquired without operating the flash, a lighting condition being determined for both acquired images, and the consecutive images with a better lighting condition being selected for color profiling;
   a set of instructions which, when loaded in a memory and executed by the processor, causes performing the color profiling of the printing device based on the consecutive images selected.

5. The product of claim 4, wherein the determining of the lighting condition includes comparing lighting between selected spots of the detected color calibration chart.

6. The product of claim 5, wherein the selected spots corresponds to separated color patches of the same color.

7. The product of claim 5, wherein the selected spots are of a background area adjacent to color patches of the color calibration chart.

8. The product of claim 7, wherein the selected spots are at an interface between different color zones of the background area.

9. The product of claim 5, further comprising a set of instructions which, when loaded into a memory and executed by the processor, causes to generate a color profile based on the detected color calibration chart, the color profile being generated taking into account lighting differences between spots of the detected color calibration chart.

10. The product of claim 5, wherein a color profile confidence interval is determined based on lighting differences between the selected spots.

11. The product of claim 4, further comprising a set of instructions which, when loaded into a memory and executed by the processor, causes, prompting a user to re-acquire the color calibration chart under a different imaging condition so as to acquire multiple images of the color calibration chart.

12. The product of claim 4, further comprising a set of instructions which, when loaded into a memory and executed by the processor, causes processing multiple images of the color calibration chart for color profiling, wherein the processing includes selecting at least one of the multiple images based on a lighting condition determined for each image.

13. The product of claim 4, further comprising a set of instructions which, when loaded into a memory and executed by the processor, causes processing multiple images of the color calibration chart for color profiling, wherein the processing includes averaging at least some of the multiple images.

14. The product of claim 4, wherein the printing device is a three-dimensional printing device.

15. A system comprising:
    a printing device;
    an imaging device;
    an acquisition engine to process an image of a color calibration chart acquired by the imaging device;

a lighting determination engine to determine a lighting condition of the acquired color calibration chart, by comparing multiple measurements of an optical property at selected spots in the imaged color calibration chart, and is to determine whether the lighting condition is appropriate for performing color calibration of the printing device based on the acquired color calibration chart, where the selected condition is an appropriate condition if a difference between the multiple contrast measurements is below a selected threshold; and a calibration engine to perform the color calibration of the printing device when the selected condition is the appropriate condition.

16. The system of claim 15 further comprising a guiding engine to guide a user in the acquisition of the color calibration under a selected lighting condition, wherein the guiding engine is to guide the user to acquire a color calibration chart under a selected angle.

17. The system of claim 15 further comprising a guiding engine to guide a user in the acquisition of the color calibration under a selected lighting condition, wherein the guiding engine is to cause displaying a frame on the display, the frame indicating acquisition of a color calibration chart under a selected angle.

18. The system of claim 15 further comprising a guiding engine to guide a user in the acquisition of the color calibration under a selected lighting condition, wherein the guiding engine is to cause the display to display the image zoomed during acquisition of the color calibration chart.

19. The system of claim 15 further comprising a camera flash to be operated for acquisition of the color calibration chart under the selected lighting condition.

20. The system of claim 15, further comprising a display, wherein the imaging device is a front camera located at a same side as the display, the display to be operated to illuminate the color calibration chart so as to facilitate acquisition of the color calibration chart under the selected lighting condition.

* * * * *